(12) United States Patent
Lahnala

(10) Patent No.: US 7,395,631 B2
(45) Date of Patent: Jul. 8, 2008

(54) SLIDING WINDOW ASSEMBLY AND A CARRIER COMPONENT

(75) Inventor: David W. Lahnala, Adrian, MI (US)

(73) Assignee: AGC Automotive Americas Co., Florence, KY (US)

( * ) Notice: Subject to any disclaimer, the term of this patent is extended or adjusted under 35 U.S.C. 154(b) by 42 days.

(21) Appl. No.: 10/918,944

(22) Filed: Aug. 16, 2004

(65) Prior Publication Data

US 2005/0150170 A1 Jul. 14, 2005

Related U.S. Application Data

(60) Provisional application No. 60/535,331, filed on Jan. 9, 2004.

(51) Int. Cl.
 *E05D 15/10* (2006.01)
(52) U.S. Cl. .............................. 49/213; 49/209; 49/130; 49/127; 49/380
(58) Field of Classification Search .................. 49/413, 49/209, 213, 130, 214, 127, 229, 380
 See application file for complete search history.

(56) References Cited

U.S. PATENT DOCUMENTS

| | | | | |
|---|---|---|---|---|
| 1,563,287 | A | * 11/1925 | Pape | ............................ 49/127 |
| 2,889,590 | A | 6/1959 | Kunkel | |
| 2,992,460 | A | 7/1961 | Hentges | |
| 3,417,509 | A | * 12/1968 | Sherron | ......................... 49/130 |
| 4,124,054 | A | 11/1978 | Spretnjak | |
| 4,384,429 | A | 5/1983 | Rokicki et al. | |
| 4,561,224 | A | 12/1985 | Jelens | |
| 4,590,707 | A | 5/1986 | von Resch | |
| 4,635,398 | A | 1/1987 | Nakamura | |
| 4,662,108 | A | 5/1987 | Duran Romero et al. | |
| 4,785,583 | A | 11/1988 | Kawagoe et al. | |
| 4,850,139 | A | 7/1989 | Tiesler | |
| 4,934,098 | A | * 6/1990 | Prouteau et al. | ................ 49/214 |
| 5,442,880 | A | 8/1995 | Gipson | |
| 5,467,560 | A | 11/1995 | Camp et al. | |
| 5,473,840 | A | 12/1995 | Gillen et al. | |
| 5,505,023 | A | * 4/1996 | Gillen et al. | ................... 49/380 |
| 5,522,191 | A | 6/1996 | Wenner et al. | |

(Continued)

OTHER PUBLICATIONS

U.S. Appl. No. 10/919,065, filed Aug. 16, 2004.

*Primary Examiner*—Gregory J Strimbu
(74) *Attorney, Agent, or Firm*—Howard & Howard Attorneys, P.C.

(57) ABSTRACT

A sliding window assembly for a vehicle includes an upper track member, a lower track member, and a carrier component. The track members each define a first channel having a first depth, a second channel having a second depth, and a third channel having a third depth less than each of the first and second depths. The carrier component includes upper and lower edges. Each edge has a first tab extending to a first length and a second tab extending to a second length. The carrier component slides in the track members to move between an open and a closed position. The first tabs slide in the first channels, the second tabs slide in the second channels, and the edges of the carrier component slide in the third channels. The first lengths correspond to the first depths and the second lengths correspond to the second depths so the tabs appropriately fit in their respective channels.

23 Claims, 9 Drawing Sheets

U.S. PATENT DOCUMENTS

| | | |
|---|---|---|
| 5,542,214 A | 8/1996 | Buening |
| 5,613,323 A | 3/1997 | Buening |
| 5,784,833 A | 7/1998 | Sponable et al. |
| 5,799,444 A | 9/1998 | Freimark et al. |
| 5,836,110 A * | 11/1998 | Buening .................. 49/360 |
| 5,996,284 A | 12/1999 | Freimark et al. |
| 5,996,285 A | 12/1999 | Guillemet et al. |
| 6,223,470 B1 | 5/2001 | Millard et al. |
| 6,438,912 B1 | 8/2002 | Avent |
| 6,591,552 B1 | 7/2003 | Rasmussen |
| 2002/0148163 A1 | 10/2002 | Warmer et al. |
| 2003/0089043 A1 | 5/2003 | Oberheide |
| 2003/0182866 A1 | 10/2003 | Nestell et al. |
| 2003/0213179 A1 | 11/2003 | Galer |
| 2004/0020131 A1 | 2/2004 | Galer et al. |
| 2005/0044797 A1* | 3/2005 | Daniel et al. .................. 49/413 |
| 2005/0044798 A1 | 3/2005 | Daniel et al. |
| 2005/0044799 A1* | 3/2005 | Kinross et al. ................ 49/413 |

* cited by examiner

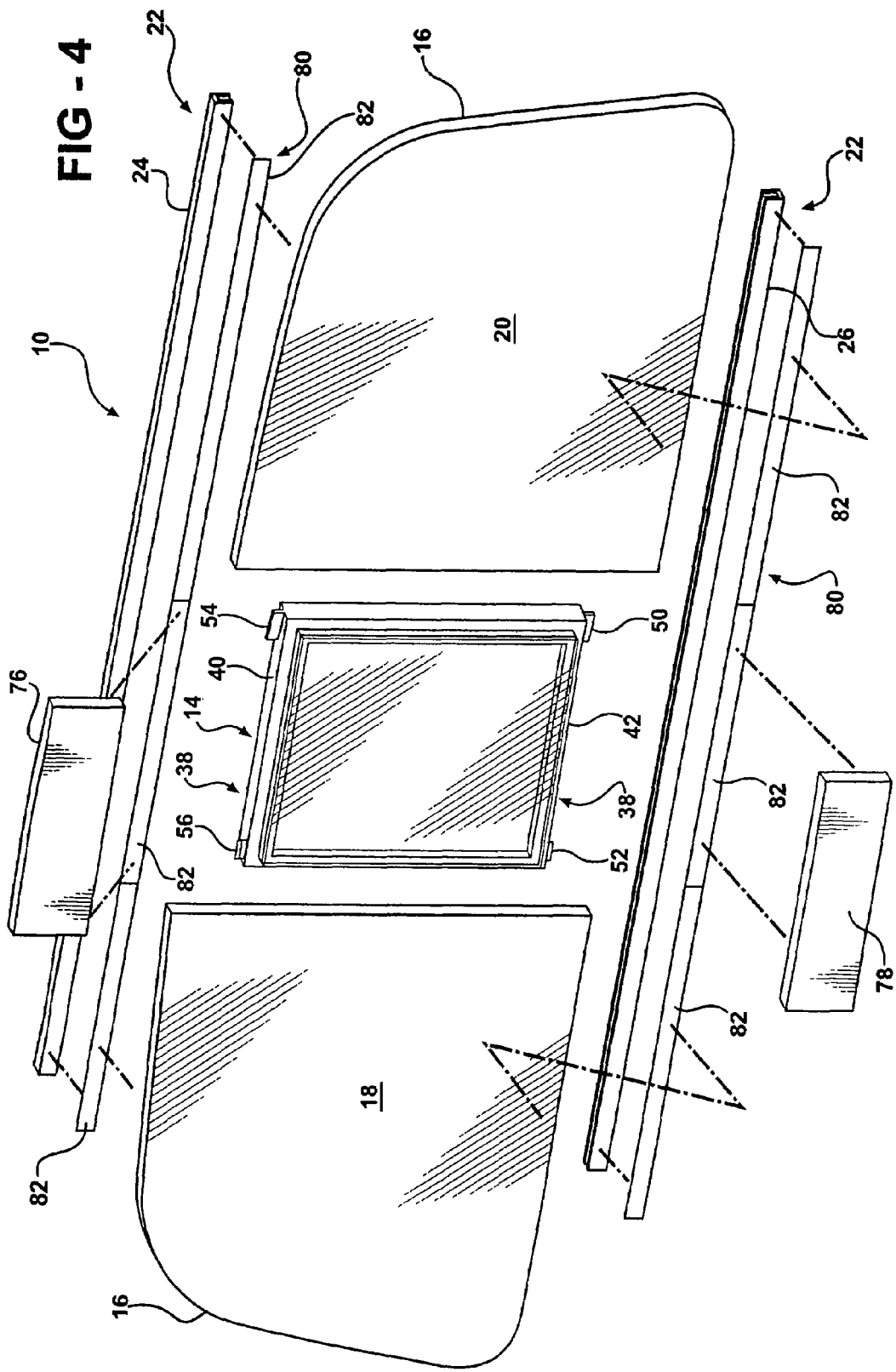

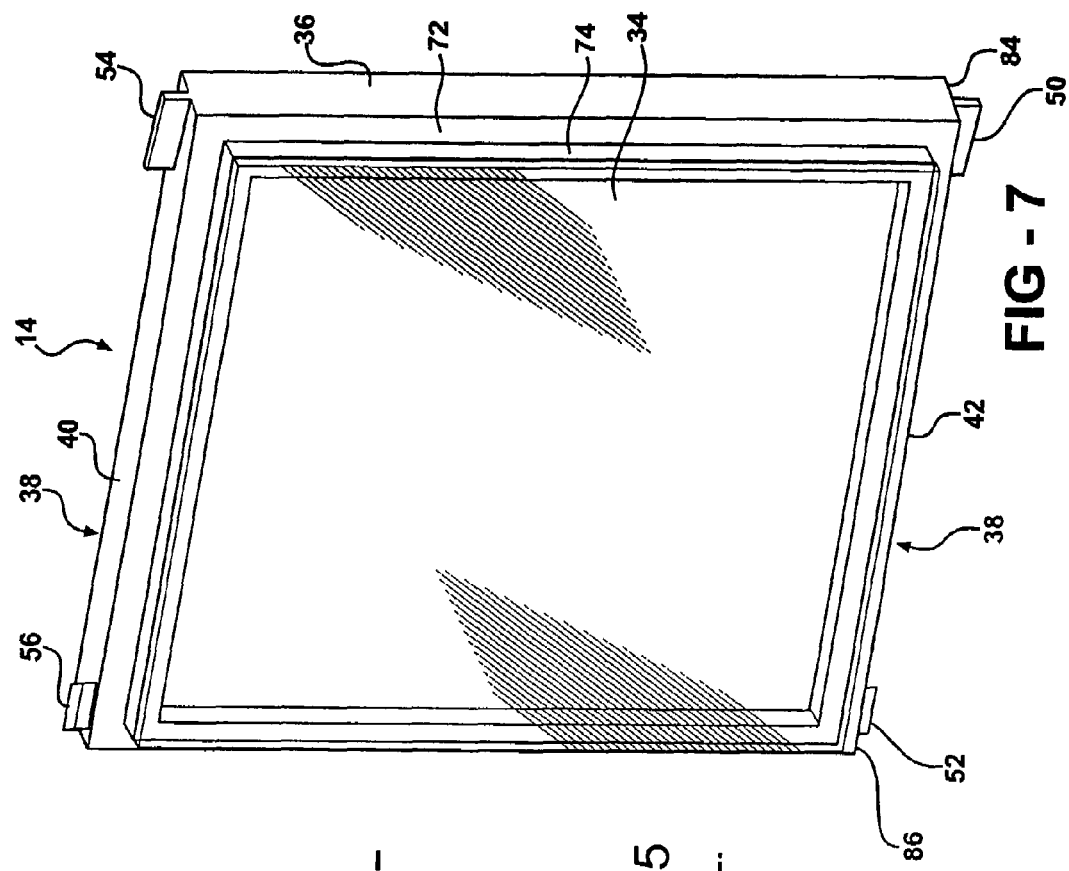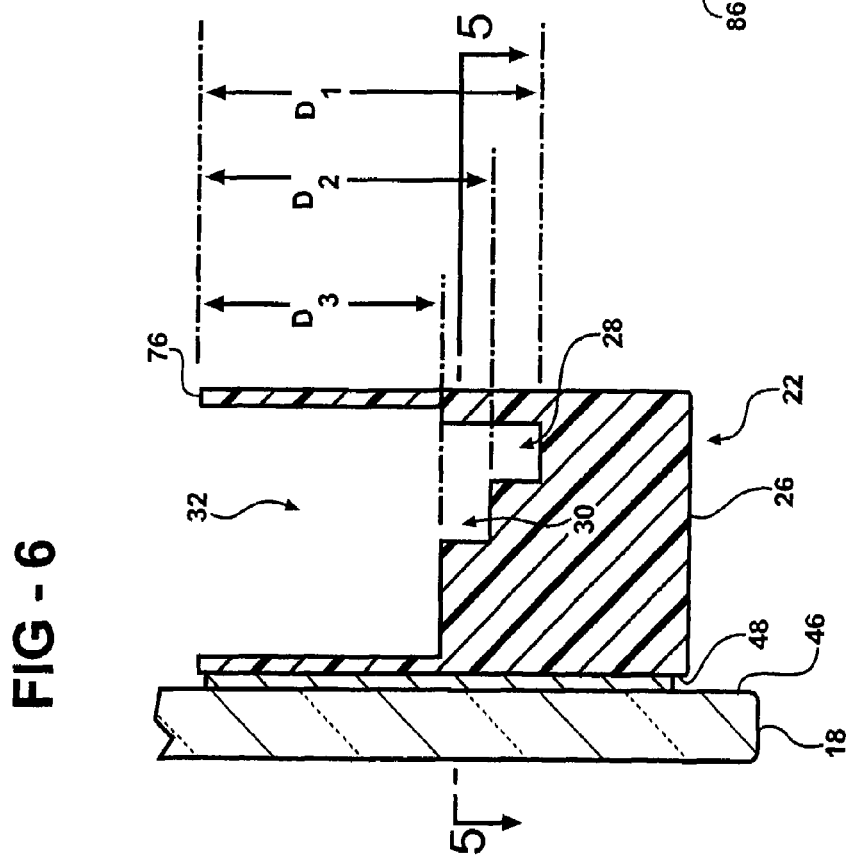

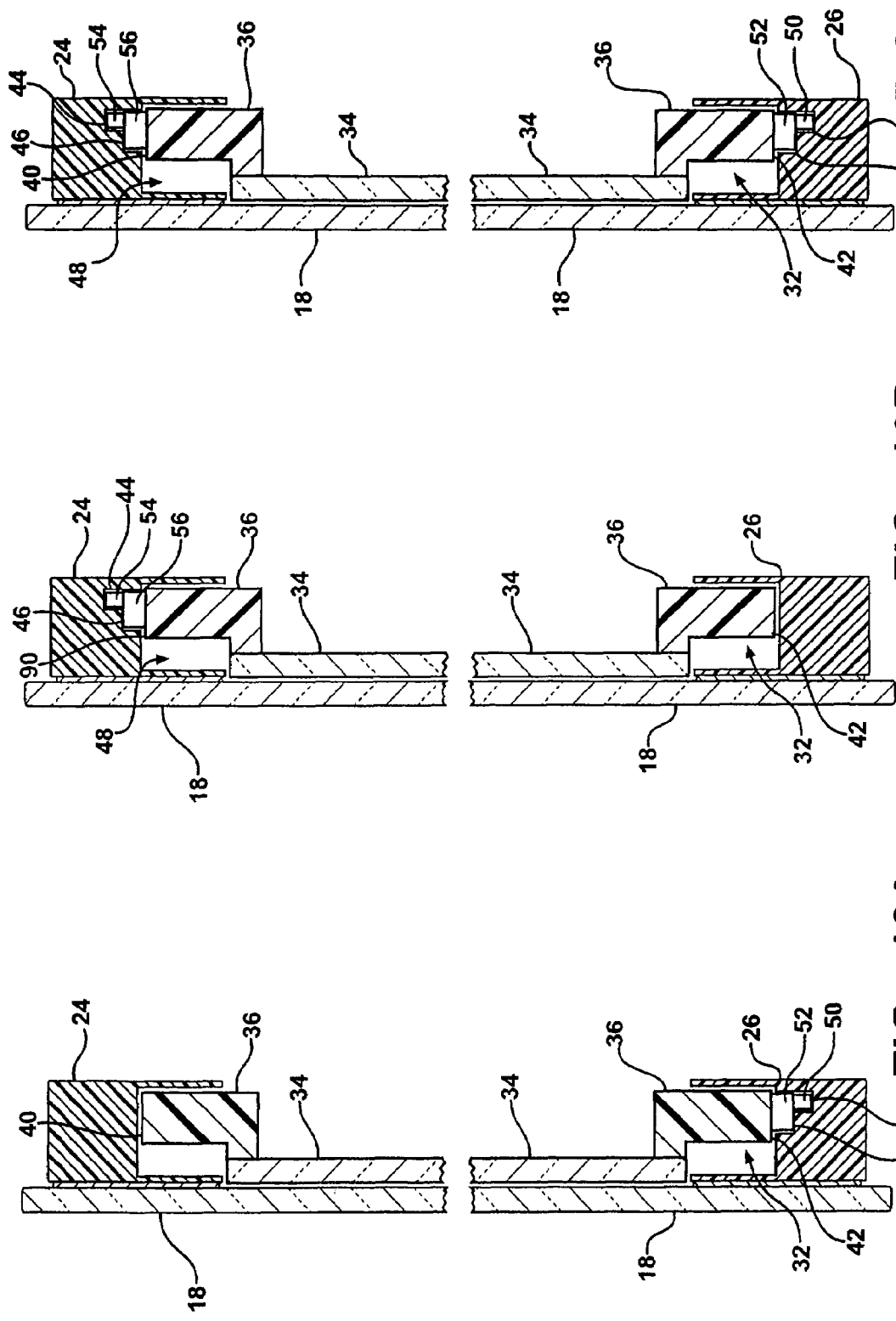

SLIDING WINDOW ASSEMBLY AND A CARRIER COMPONENT

RELATED APPLICATIONS

The subject patent application claims priority to and all the benefits of U.S. Provisional Patent Application Ser. No. 60/535,331, which was filed on Jan. 9, 2004.

BACKGROUND OF THE INVENTION

1. Field of the Invention

The subject invention relates to a sliding window assembly, particularly for a vehicle, wherein a sliding unit includes a carrier component slidable along a track member.

2. Description of the Related Art

Various sliding window assemblies for vehicles are known in the prior art. Examples of such an assembly are disclosed in U.S. Pat. No. 5,542,214 (the '214 patent) to Buening.

The sliding window assembly disclosed in the '214 patent includes several embodiments of a sliding unit. In all embodiments, the sliding unit is slidable along a track member between an open and a closed position. In one embodiment, the sliding unit includes a carrier component and a sliding panel. The carrier component is operatively connected to the sliding panel for supporting the sliding panel as the carrier component moves along the track member. The carrier component includes an edge with a first pin and a second pin extending from the edge. The first and second pins are identical and each have circular cross-sections. The pins are slidable in a first channel of the track member. The edge is slidable in a second channel of the track member.

In another embodiment of the '214 patent, the sliding unit does not include a carrier component. Rather, the first pin and the second pin are affixed directly to the sliding panel. A track member includes a first channel extending to a first depth for receiving the first pin and a second channel extending to a second depth for receiving the second pin. The first channel defines a first width and the second channel defines a second width. The first width is less than the second width. Accordingly, the first pin is sized to only fit in the first channel and the second pin is sized to only fit in the second channel. The first and second channels each have a right angle bend for forcing the pins attached to the sliding panel to abruptly change direction by 90° as the panel is moved from the open to the closed position. This abrupt change in direction is difficult to operate and results in a sliding window assembly that is not aesthetically pleasing when opening the sliding panel. Also, the sliding panel is not directly supported by the track member, thus promoting vibration and rattle.

The prior art, as evidenced by the specific disclosures of the '214 patent, provides many sliding window assemblies. However, there remains an opportunity to provide a sliding window assembly including a sliding panel that is easy to operate and that has a smooth and stable movement between an open and a closed position.

SUMMARY OF THE INVENTION AND ADVANTAGES

The invention provides a sliding window assembly for a vehicle. The assembly includes a track member defining a first channel and a second channel. The assembly also includes a sliding panel and a carrier component. The carrier component is movable along the track member between an open position and a closed position. Also, the carrier component is operatively connected to the sliding panel for supporting the sliding panel as the carrier component moves. The carrier component includes an edge, a first tab, and a second tab. The first tab extends from the edge for sliding in the first channel and the second tab extends from the edge for sliding in the second channel as the carrier component moves between the open and closed positions.

Accordingly, the combination of the edge, the first tab, and the second tab provides for an extremely stable and smooth movement of the carrier component between the open and closed positions. Due to the multitude of channels engaged with the carrier component, specifically with the edge and the first and second tabs of the carrier component, rattle and vibration of the carrier component are significantly reduced relative to sliding window assemblies of the prior art. Also, the carrier component is aesthetically pleasing as it moves between the open and closed positions.

DESCRIPTION OF THE SEVERAL VIEWS OF THE DRAWINGS

Other advantages of the present invention will be readily appreciated as the same becomes better understood by reference to the following detailed description when considered in connection with the accompanying drawings wherein:

FIG. 4 is an exploded view of the preferred embodiment of the sliding window assembly;

FIG. 6 is a cross-sectional side view taken along lines 6-6 of FIG. 2 and FIG. 5 illustrating the first and second channels and a third channel of the track member;

FIG. 7 is a perspective view of the sliding unit of the sliding window assembly showing a carrier component and a sliding panel;

FIG. 10A is a cross-sectional side view of the sliding window assembly showing an upper track member and a lower track member with the first, second, and third channels;

FIG. 10B is a cross-sectional side view of the sliding window assembly showing the lower track member and the upper track member with fourth, fifth, and sixth channels; and FIG. 10C is a cross-sectional side view of the sliding window assembly showing the lower track member with the first, second, and third channels, and the upper track member with the fourth, fifth, and sixth channels.

DETAILED DESCRIPTION OF THE INVENTION

Figure 1:
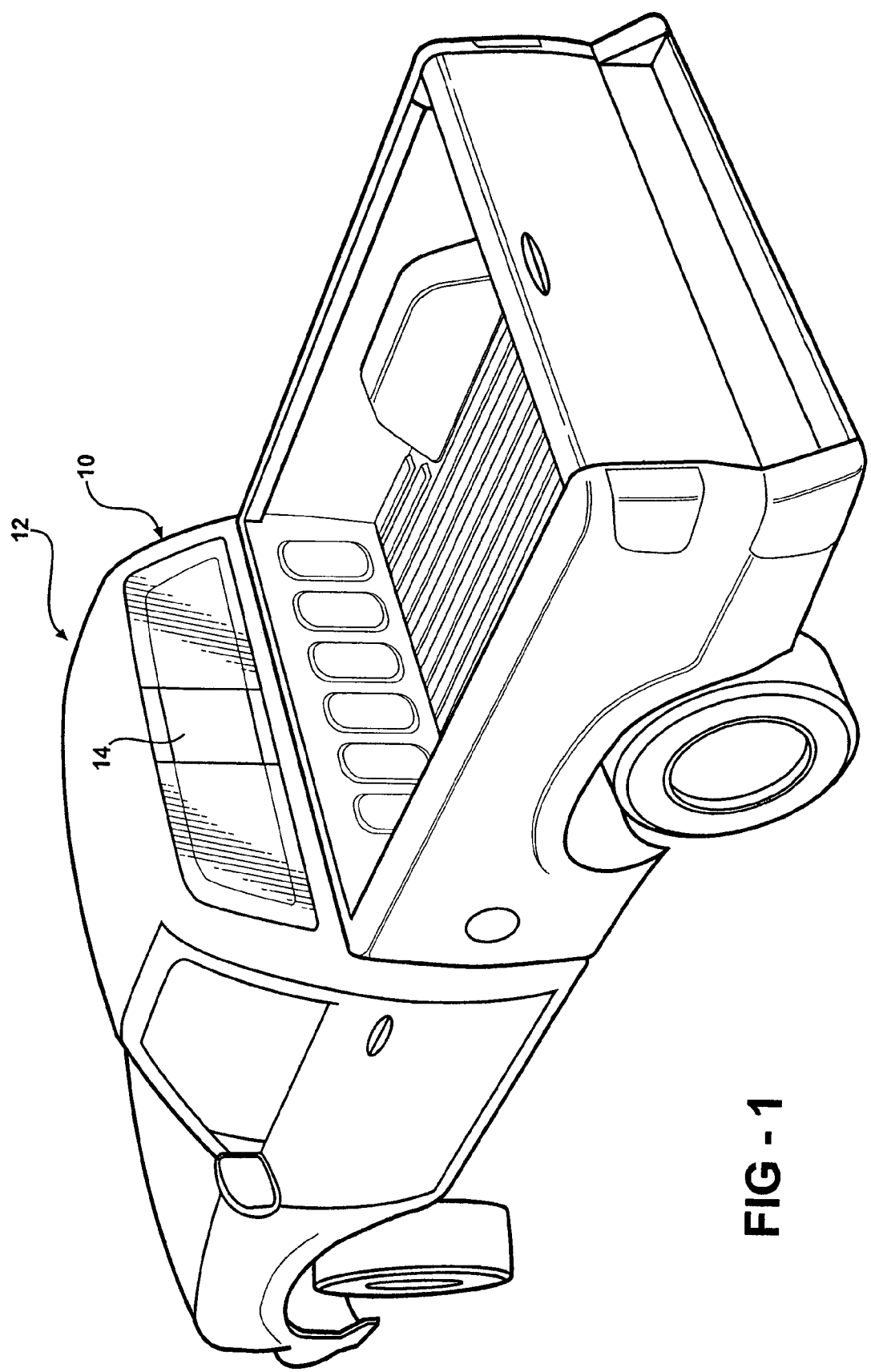
FIG. 1 is a perspective view of a vehicle with a sliding window assembly implemented as a backlite of the vehicle.

Referring to the Figures, wherein like numerals indicate like parts throughout the several views, a sliding window assembly is generally shown at 10. Referring to FIG. 1, the sliding window assembly 10 is shown in a vehicle 12, specifically as a backlite in a pickup truck. However, it is to be appreciated that the sliding window assembly 10 of the present invention can be implemented in other types of vehicles, as well as in non-vehicle applications.

Figure 2:
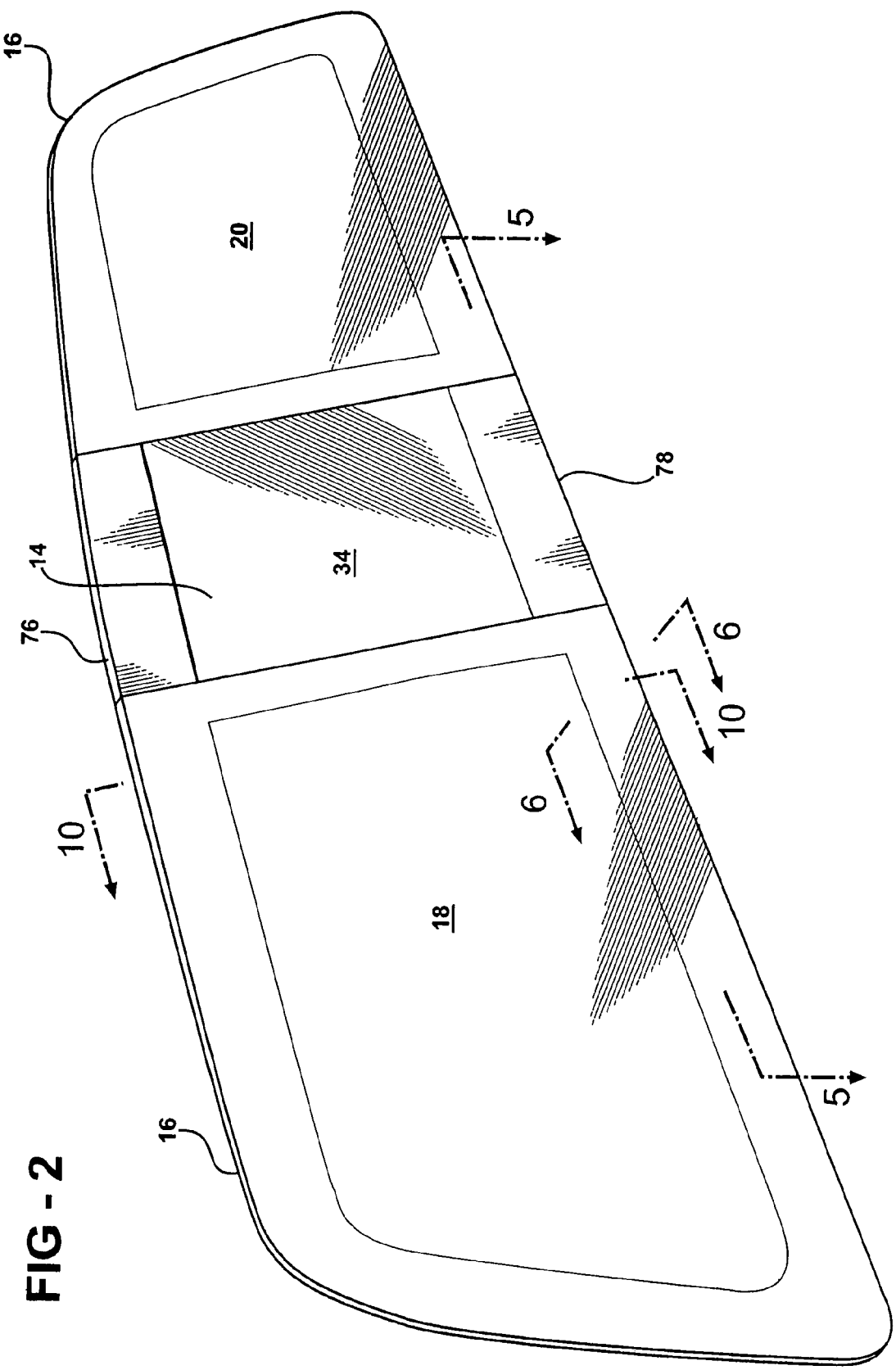
FIG. 2 is a perspective view of the sliding window assembly including a sliding unit with the sliding unit in a closed position.
Figure 3A:
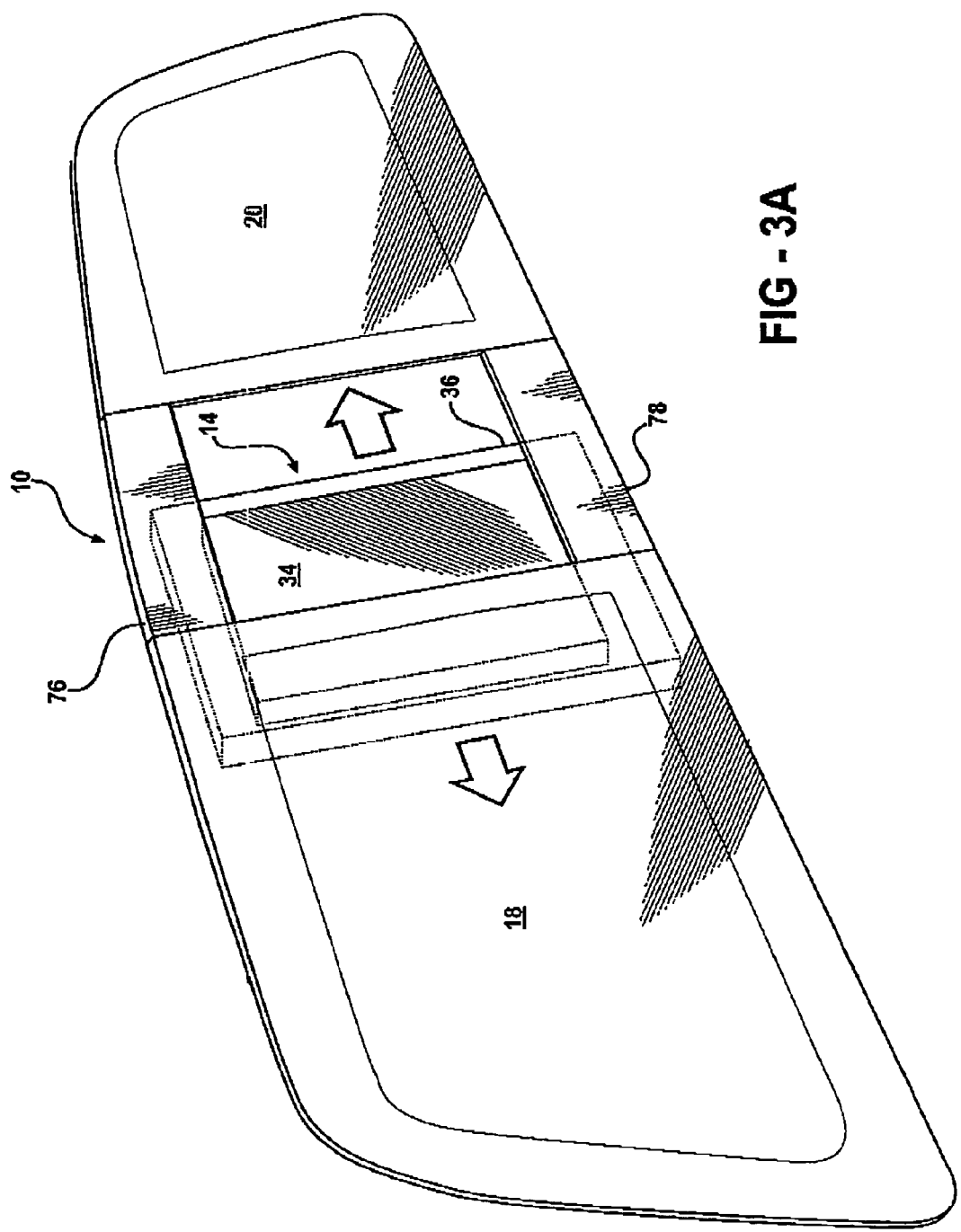
FIG. 3A is a perspective view of a preferred embodiment of the sliding window assembly with the sliding unit horizontally movable between an open and the closed position.
Figure 3B:
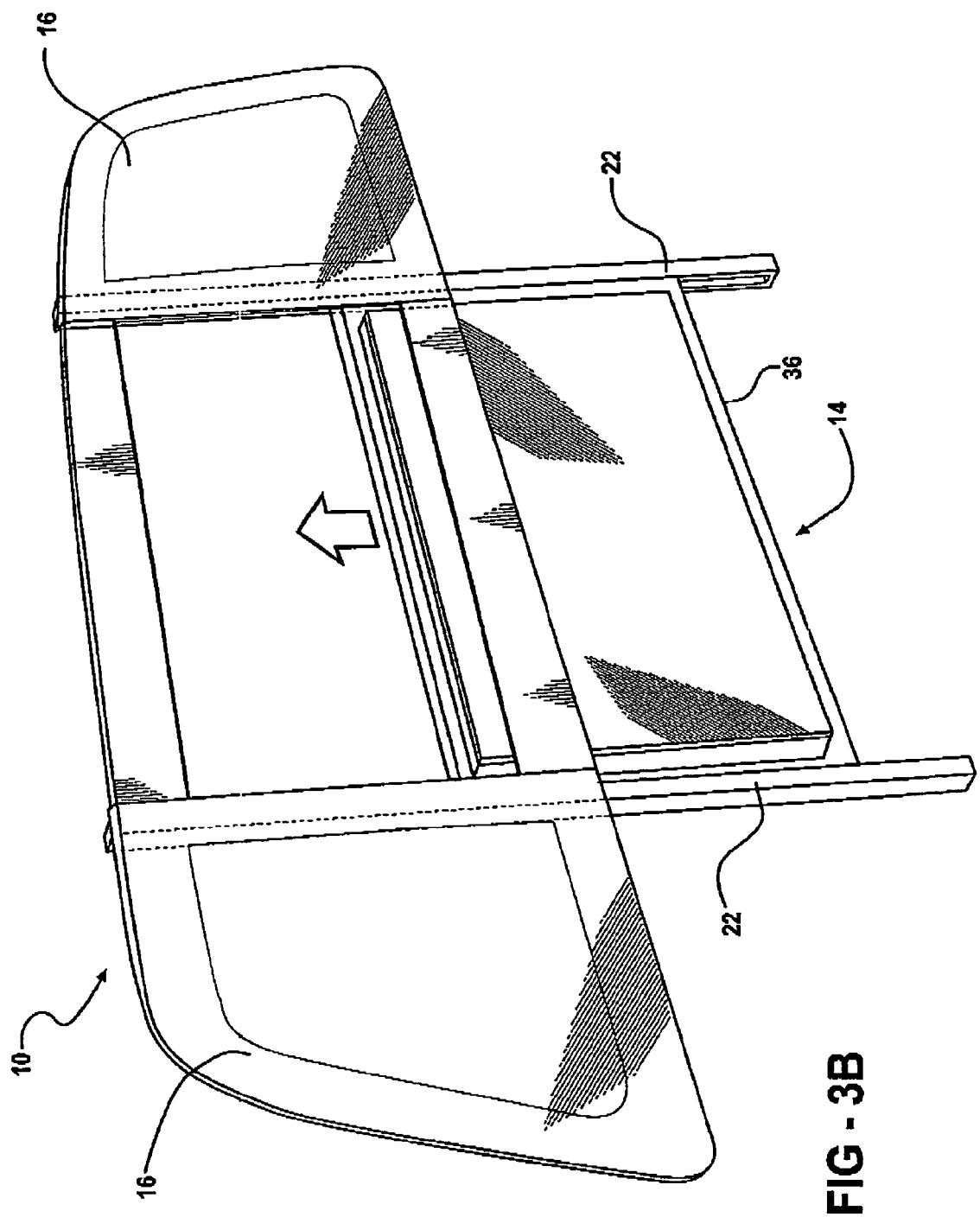
FIG. 3B is a perspective view of an alternative embodiment of the sliding window assembly with the sliding unit vertically movable between the open and the closed position.

Referring to FIGS. 2 through 3B, the assembly 10 includes a sliding unit 14 that is slidable between a closed position and an open position. The sliding unit 14 is shown in the closed position in FIG. 2. The assembly 10 further includes at least one fixed panel 16. In the preferred embodiment, the at least one fixed panel 16 is further defined as a first fixed panel 18 and a second fixed panel 20. The first and second fixed panels 16, 18 are spaced apart from each other and define an opening therebetween. The sliding unit 14 moves between the open and closed positions to modify a size of the opening. The first and second fixed panels 18, 20 are preferably formed of glass, but can be formed of plastic, metal, and the like.

The sliding unit 14 slides horizontally, as shown in FIG. 3A, in the preferred embodiment. While sliding, the sliding unit 14 moves inward relative to the first fixed panel 18, i.e., toward an interior or cab of the vehicle 12. It is appreciated, however, that horizontal movement of the sliding unit 14 is not a necessary component of the scope of the invention. Accordingly, FIG. 3B illustrates an alternative embodiment where the sliding unit 14 is adapted to slide vertically.

FIG. 4 shows the various elements of the preferred embodiment of the assembly 10 in an "exploded" illustration. The assembly 10 further includes at least one track member 22 for supporting and for enabling movement of the sliding unit 14. In the preferred embodiment, the at least one track member 22 is implemented as an upper track member 24 and a lower track member 26. The upper track member 24 is spaced from and substantially parallel to the lower track member 26. However, those skilled in the art appreciate that the assembly 10 can be implemented with only one track member 22 interfacing with the sliding unit 14.

The first and second fixed panels 18, 20 of the preferred embodiment are operatively connected to the track members 24, 26. An adhesive 80 is used to adhere the fixed panels 18, 20 to the track member 22. Preferably, the adhesive 80 is an adhesive tape 82. An example of an acceptable tape 44 is a two sided foam tape manufactured by the 3M Company headquartered in St. Paul, Minn. Alternatively, a urethane adhesive or other suitable adhesive may be used instead of the adhesive tape 82.

Figure 5:
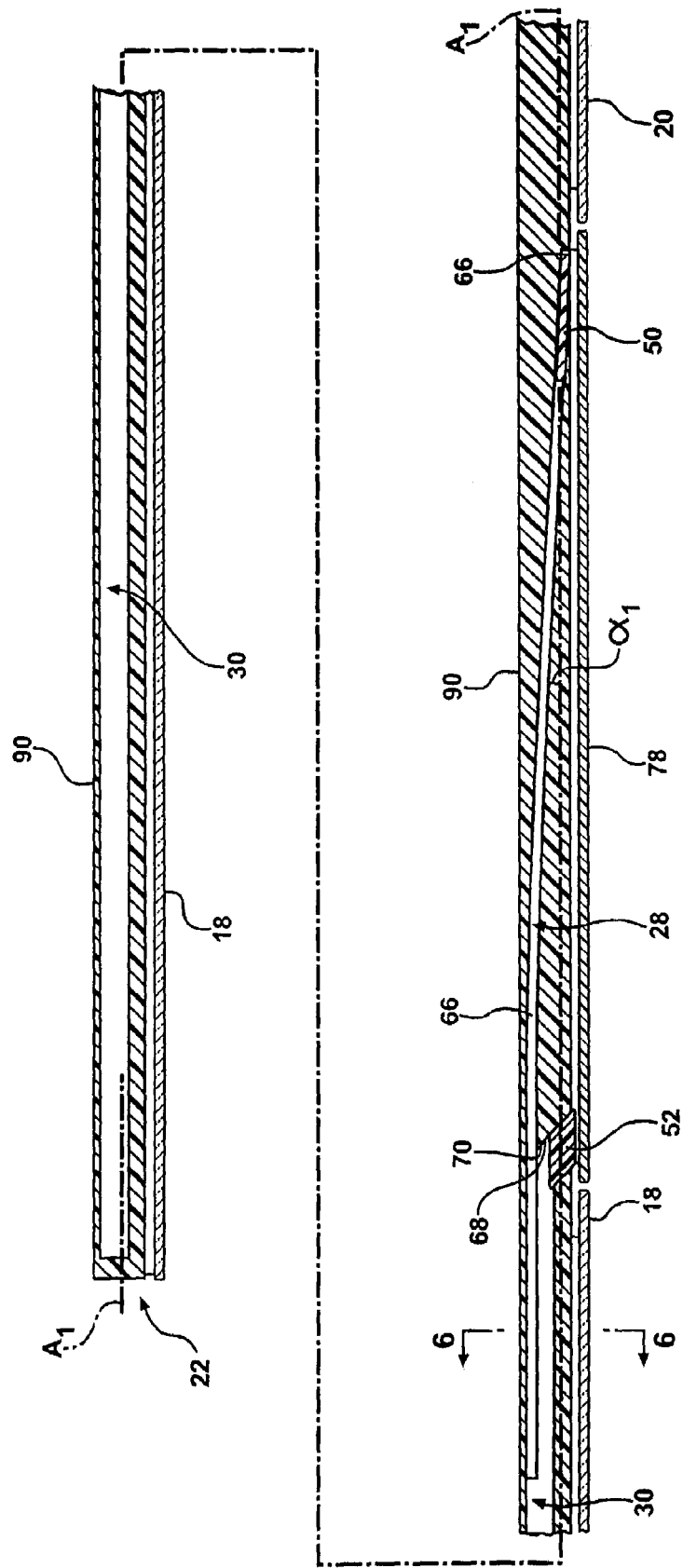
FIG. 5 is a cross-sectional top view taken along line 5-5 of FIG. 2 illustrating a track member having first and second channels and first and second tabs of the sliding unit received within the first and second channels.

Referring now to FIGS. 5 and 6, the track member 22 defines a first channel 28 and a second channel 30. In the preferred embodiment, the track member 22 also defines a third channel 32. The first channel 28 extends to a first depth $D_1$, the second channel 30 extends to a second depth $D_2$, and the third channel 32 extends to a third depth $D_3$. The third depth $D_3$ is less than the second depth $D_2$. The second depth $D_2$ is preferably less than the first depth $D_1$.

Referring specifically to FIG. 5, a first longitudinal axis $A_1$ extends lengthwise between ends of the track member 22. In the preferred embodiment, the first channel 28 includes a portion 66 extending non-parallel to the first longitudinal axis $A_1$. The portion 66 of the first channel 28 defines a first angle $\alpha_1$ with respect to the first longitudinal axis $A_1$. The track member 22 also includes an angled internal surface 68 defining a terminus 70 of the second channel 30.

As shown in FIG. 7, the sliding unit 14 includes a sliding panel 34 and a carrier component 36. The sliding panel 34 is operatively connected to the carrier component 36. The operative connection between the sliding panel 34 and the carrier component 36 is described in detail below. The carrier component 36 is movable along the track member 22 between the open position and the closed position. The carrier component 36 supports the sliding panel 34 as the carrier component 36 moves along the track member 22.

The carrier component 36 preferably includes at least one edge 38 slidable in the track member 22 for moving the carrier component 36 between the closed position and the open position. In the preferred embodiment, the lower track member 26 defines the first, second, and third channels 28, 30, 32, while the upper track member 24 defines fourth, fifth, and sixth channels 44, 46, 48. The carrier component 36 includes an upper edge 40 slidable in the upper track member 24 and a lower edge 42 slidable in the lower track member 26. More specifically, the upper edge 40 is slidable in the sixth channel 48 and the lower edge 42 is slidable in the third channel 32.

The carrier component 36 further includes a first tab 50 extending from the lower edge 42 for sliding in the first channel 28. A second tab 52 also extends from the lower edge 42 for sliding in the second channel 30. Furthermore, the carrier component 36 includes a third tab 54 and a fourth tab 56 extending from the upper edge 40 and slidable respectively in the fourth channel 44 and the fifth channel 46 of the upper track member 24. The third and fourth tabs 54, 56 are preferably identical in shape in size to and are mirror images of the first and second tabs 50, 52. For purposes of clarity, the lower track member 26 will be described below in conjunction with the first and second tabs 50, 52 and the lower edge 42. It is realized, however, that the track member 22 may be implemented as the upper track member 24 along with the third and fourth tabs 54, 56 and the upper edge 40.

Figure 8:
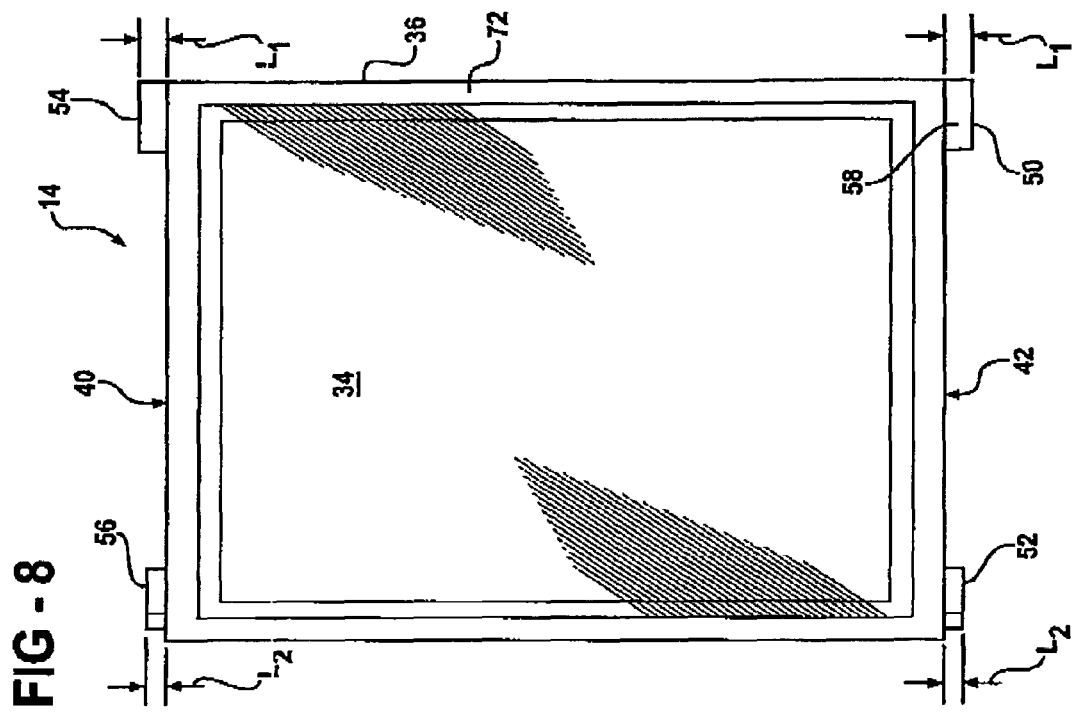
FIG. 8 is a front view of the sliding unit illustrating lengths of the tabs extending from the carrier component.

Referring to FIG. 8, the first tab 50 extends to a first length $L_1$ and the second tab 52 extends to a second length $L_2$. It is preferred that the second length $L_2$ of the second tab 56 is less than the first length $L_1$ of the first tab 50. The first and second lengths $L_1$, $L_2$ correspond respectively to the first and second depths $D_1$, $D_2$ of the lower track member 26.

Figure 9A:
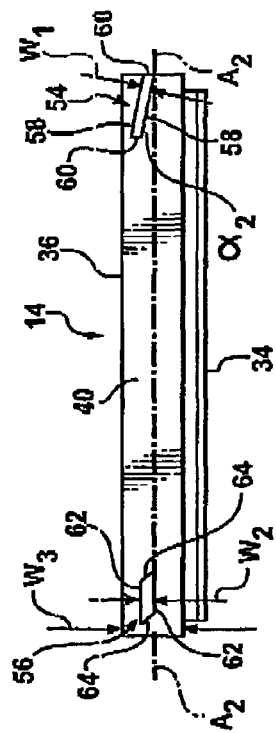
FIG. 9A is a bottom view of the sliding unit illustrating widths of the tabs.
Figure 9B:
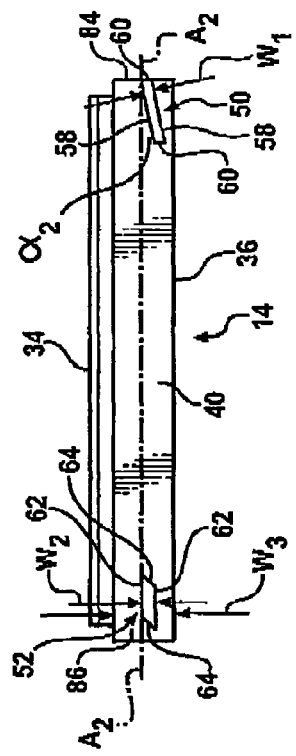
FIG. 9B is a top view of the sliding unit illustrating the widths of the tabs.

As shown in FIG. 9A, the first tab 50 preferably includes a first pair of surfaces 58 parallel to one another. A first width $W_1$ is defined between the first pair 58. Preferably, the first tab 50 further includes a second pair of surfaces 60 parallel to one another and generally perpendicular to the first pair of surfaces 58. This configuration of first and second pairs of surfaces 58, 60 establishes a rectangular shaped cross-section of the first tab 50. The first tab 50 is preferably disposed adjacent a first end 84 of the lower edge 42. However, the first tab 50 may be disposed at other locations along the lower edge 42.

A second longitudinal axis $A_2$ extends lengthwise along the edge 38 of the carrier component 36. The second longitudinal axis $A_2$ is parallel to the first longitudinal axis $A_1$ when the carrier component 36 is situated in the lower track member 26 and the carrier component 36 is in the closed position. Preferably, the first tab 50 is non-parallel relative to the second longitudinal axis $A_2$ for coupling with the portion 66 of the first channel 28. Specifically, the first tab 50 defines a second angle $\alpha_2$ with respect to the second longitudinal axis $A_2$. The first angle $\alpha_1$ is substantially similar to the second angle $\alpha_2$.

The second tab 52 includes a third pair of surfaces 62 parallel to one another. A second width $W_2$ is defined between the third pair of surfaces 62. In the preferred embodiment, the second tab 52 includes an angled surface 64 for engaging the angled internal surface 68. This engagement forces the carrier component 36 into the closed position as the carrier component 36 moves from the open to the closed position. Preferably, the second tab 52 further includes a pair of angled surfaces 64 parallel to one another and generally non-perpendicular to the third pair of surfaces 62. This configuration establishes a parallelogram shaped cross-section of the second tab 52. The second tab 52 is disposed nearby a second end 86 of the lower edge 42 opposite the first end 84. However, the second tab 52 may be disposed at other locations along the lower edge 42.

The first channel 28 of the track member 22 is sized to receive the first tab 50. Specifically, the first channel 28 has a width that is slightly greater than the first width $W_1$ of the first tab 50. This allows the first tab 50 to be received by the first channel 28 and to slide easily along the first channel 28 as the carrier component 36, and therefore the sliding panel 34, moves between the closed and open positions. Likewise, the second channel 30 is sized to receive the second tab 52. The second channel 30 has a width that is slightly greater than the second width $W_2$. The first width $W_1$ is less than the second width $W_2$ for preventing the second tab 52 from being received by the first channel 28, primarily as the carrier component 36 moves between the open and closed positions.

The lower edge 38 of the carrier component 36 is slidable in the third channel 32. The combination of the first tab 50, second tab 52, and lower edge 42 slidable in the first, second, and third channels 28, 30, 32 allows for secure and stable movement of the carrier component 36 between the open and closed positions. The combination also reduces rattle or vibration of the carrier component 36 during movement.

The carrier component 36 is preferably formed of a polymer. An example of an acceptable polymer is Zytel®, available from E.I. du Pont de Nemours and Company, headquartered in Wilmington, Del. However, other similar plastics of a polymer family are also acceptable. The sliding panel 34 is preferably formed of glass. However, the sliding panel 34 may be formed of plastic, metal, or any other suitable material. The tabs 50, 52, 54, 56 may be adhered or otherwise connected to the edges 40, 42 of the carrier component 36. However, it is preferred that that the tabs 50, 52, 54, 56 are integrally molded with and of the same material as the carrier component 36.

Referring again to FIG. 7, in the preferred embodiment, the carrier component 36 further includes an outer face 72 perpendicular to and separating the upper and lower edges 40, 42. A flange portion 74 extends from the outer face 72. The operative connection between the carrier component 36 and the sliding panel 18 is preferably accomplished by at least partially encapsulating the flange portion 74 of the carrier component 36 around the sliding panel 18. Alternatively, the sliding panel 18 may be adhered to the flange portion 74 of the carrier component 36 using an adhesive 80.

Again referencing FIG. 2, in the preferred embodiment, the assembly 10 establishes a substantially flush exterior surface when the sliding unit 14 is closed. More specifically, the sliding panel 34 includes an exterior surface and the first and second fixed panels 18, 20 include exterior surfaces. When the sliding unit 14 is in the closed position, all of these exterior surfaces are substantially flush relative to one another. Preferably, the assembly 10 also includes an upper panel 76 and a lower panel 78 situated in the opening between the first and second fixed panels 18, 20, and above and below the sliding panel 34. The upper and lower panels 76, 78 also each have an exterior surface which is substantially flush relative to the exterior surfaces of the first and second fixed panels 18, 20 and the exterior surface of the sliding panel 34 when the sliding unit 14 is in the closed position. The upper and lower panels 76, 78 are preferably formed of a polycarbonate plastic, but can be formed of other plastics, glass, metal, and the like.

Those skilled in the art realize that many combinations and configurations of channels 28, 30, 32, 44, 46, 48 in track members 24, 26 and tabs 50, 52, 54, 56 extending from the carrier component 36 can be implemented. One embodiment of the assembly 10, shown in FIG. 10A, has the first and second tabs 50, 52 extending from the lower edge 42 of the carrier component 36 and interfacing with the first and second channels 28, 30 of the lower track member 26. A second embodiment of the assembly 10, shown in FIG. 10B has the third and fourth tabs 54, 56 extending from the upper edge 40. The upper track member 24 defines the fourth channel 44 for receiving the third tab 54, the fifth channel 46 for receiving the fourth tab 56, and the sixth channel 48 for receiving the upper edge 40 of the carrier component 36. The first and second tabs 50, 52 are not present in the second embodiment. FIG. 10C illustrates the preferred embodiment where the first and second tabs 50, 52 extend from the lower edge 42 for interface with the first through third channels 28, 30, 32 of the lower track member 26 and the third and fourth tabs 54, 56 extend from the upper edge 40 for interface with the fourth through sixth channels 44, 46, 48 of the upper track member 24.

Those skilled in the art also realize that other alternative configuration of the carrier component 36 can also be implemented. For example, in a first alternative configuration, the first tab 50 extends from the lower edge 42 and the fourth tab 56 extends from the upper edge 40. The second and third tabs 52, 54 are not utilized in this configuration. Conversely, in a second alternative configuration, the second tab 52 extends from the lower edge 42, the third tab 54 extends from the upper edge 40 and the first and fourth tabs 50, 56 are not used.

The sliding unit 14 may also include a seal (not shown). The seal is preferably disposed about a perimeter of the outer face 72 of the carrier component 36. When the carrier component 36 is in the closed position, the seal is compressed between the carrier component 36 and the fixed panels 18, 20 and the upper and lower panels 76, 78. The is preferably formed of rubber or another suitable material.

Those skilled in the art also realize that the sliding window assembly 10 may be equipped for either manual or automatic operation. In manual operation, the sliding unit 14 is opened and closed by hand. For automatic operation, a motor (not shown) is operatively connected to the sliding unit 14. When the motor is activated, the sliding unit 14 is driven either open or closed, depending on the desired movement. This automatic operation can be implemented with the sliding unit 14 moving either horizontally or vertically.

Obviously, many modifications and variations of the present invention are possible in light of the above teachings. The invention may be practiced otherwise than as specifically described within the scope of the appended claims.

What is claimed is:

1. A sliding unit for a sliding window assembly with the sliding window assembly including a track member defining a first channel and a second channel, said sliding unit comprising:

a sliding panel;

a carrier component movable along the track member between an open position and a closed position and operatively connected to said sliding panel for supporting said sliding panel as said carrier component moves;

said carrier component including an edge, a first tab extending from said edge to a first length for sliding in the first channel, and a second tab disposed apart from said first tab and extending from said edge to a second length less than said first length for sliding in the second channel as said carrier component moves between said open and closed positions;

said first tab including a first pair of surfaces parallel to one another with a first width defined between said first pair of surfaces;

said second tab including a third pair of surfaces parallel to one another with a second width defined between said third pair of surfaces;

said second tab further including at least one generally planar angled surface generally non-perpendicular to said third pair of surfaces; said surfaces of said first tab extending generally continuously from said edge to a distal end of said first tab; and the surfaces of said second tab extending generally continuously from said edge to a distal end of said second tab.

2. A sliding unit as set forth in claim 1 wherein said first tab and said second tab are integrally molded with said carrier component.

3. A sliding unit as set forth in claim 1 wherein said first width is less than said second width.

4. A sliding unit as set forth in claim 3 wherein said first channel is sized to receive said first width of said first tab and said second channel is sized to receive said second width of said second tab.

5. A sliding unit as set forth in claim 4 wherein said first width is less than said second width for preventing said second tab from being received by said first channel.

6. A sliding window assembly for a vehicle comprising:
a track member defining a first channel extending to a first depth and a second channel extending to a second depth less than said first depth;
a sliding panel;
a carrier component movable along said track member between an open position and a closed position and operatively connected to said sliding panel for supporting said sliding panel as said carrier component moves;
said carrier component including an edge, a first tab extending from said edge to a first length for sliding in the first channel, and a second tab spaced from said first tab along said edge and extending from said edge to a second length less than said first length for sliding in the second channel as said carrier component moves between said open and closed positions;
said first tab includes a first pair of surfaces generally planer and generally parallel to one another with a first width defined between said first pair of surfaces said first tab extending to a distal end which slidably engages said track member in said first channel;
said second tab includes a third pair of surfaces generally planer and generally parallel to one another with a second width defined between said third pair of surfaces said second tab extending to a distal end which slidably engages said track member in said second channel; and
said first tab and said second tab extending in the same direction from said edge.

7. A sliding window assembly as set forth in claim 6 wherein said second tab further includes an angled surface generally non-parallel with respect to said third pair of surfaces.

8. A sliding window assembly as set forth in claim 7 wherein said track member includes an angled internal surface defining a terminus of said second channel for engaging said angled surface of said second tab to direct said carrier component into said closed position.

9. A sliding window assembly as set forth in claim 7 wherein said angled surface of said second tab is further defined as a pair of angled surfaces parallel to one another and generally non-perpendicular to said third pair of surfaces.

10. A sliding window assembly as set forth in claim 6 further comprising a first longitudinal axis extending lengthwise between ends of said track member wherein said first channel includes a portion extending non-parallel to said first longitudinal axis for guiding said first tab between an outside facing of said track member and an inside facing of said track member as said carrier component moves between said closed and open positions.

11. A sliding window assembly as set forth in claim 10 further comprising a second longitudinal axis extending lengthwise along said edge of said carrier component and parallel to said first longitudinal axis wherein said first pair of surfaces of said first tab are non-parallel relative to said second longitudinal axis for coupling with said portion of said first channel.

12. A sliding window assembly as set forth in claim 11 wherein said portion of said first channel defines a first angle with respect to said first longitudinal axis.

13. A sliding window assembly as set forth in claim 12 wherein at least one of said first pair of surfaces of said first tab defines a second angle with respect to said second longitudinal axis with said first angle being substantially similar to said second angle.

14. A sliding window assembly as set forth in claim 6 wherein said track member is further defined as a lower track member and said edge of said carrier component is further defined as a lower edge.

15. A sliding window assembly as set forth in claim 14 further comprising an upper track member spaced from and substantially parallel to said lower track member and said carrier component further including an upper edge with a third tab and a fourth tab extending from said upper edge for interfacing with said upper track member.

16. A sliding window assembly as set forth in claim 15 wherein said carrier component further includes an outer face perpendicular to and separating said upper and lower edges.

17. A sliding window assembly as set forth in claim 16 wherein said carrier component further includes a flange portion extending from said outer face.

18. A sliding window assembly as set forth in claim 17 wherein said sliding panel is operatively connected to said flange portion.

19. A sliding window assembly as set forth in claim 6 wherein said sliding panel is at least partially encapsulated by said carrier component.

20. A sliding window assembly as set forth in claim 6 further comprising an adhesive disposed between said sliding panel and said carrier component for adhering said sliding panel to said carrier component.

21. A sliding window assembly as set forth in claim 6 wherein the sliding window assembly further includes a fixed panel having an exterior surface.

22. A sliding window assembly as set forth in claim 21 wherein said sliding panel includes an exterior surface and said exterior surface of said sliding panel and said exterior surface of said fixed panel are substantially flush with one another when said carrier component is in said closed position.

23. A sliding window assembly as set forth in claim 6 wherein said first tab further includes a second pair of surfaces parallel to one another and generally perpendicular to said first pair of surfaces.

* * * * *

UNITED STATES PATENT AND TRADEMARK OFFICE
CERTIFICATE OF CORRECTION

PATENT NO. : 7,395,631 B2
APPLICATION NO. : 10/918944
DATED : July 8, 2008
INVENTOR(S) : David W. Lahnala Page 1 of 1

It is certified that error appears in the above-identified patent and that said Letters Patent is hereby corrected as shown below:

Column 7, line 64, after "said" delete "caffier" and insert therein -- carrier --.

Signed and Sealed this

Twenty-third Day of December, 2008

JON W. DUDAS
*Director of the United States Patent and Trademark Office*